United States Patent
Das et al.

(10) Patent No.: US 12,456,910 B2
(45) Date of Patent: Oct. 28, 2025

(54) LATCH-UP MITIGATED CHARGE PUMP FOR HIGH POWER SUPPLY REJECTION LOW-DROPOUT REGULATOR

(71) Applicant: Cisco Technology, Inc., San Jose, CA (US)

(72) Inventors: Bibhu Prasad Das, Philadelphia, PA (US); Abhishek Bhat, Allentown, PA (US); Kadaba Lakshmikumar, Hillsborough, NJ (US); Romesh Kumar Nandwana, Chapel Hill, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 286 days.

(21) Appl. No.: 18/299,174

(22) Filed: Apr. 12, 2023

(65) Prior Publication Data

US 2024/0348143 A1    Oct. 17, 2024

(51) Int. Cl.
*H02M 1/00* (2007.01)
*H02M 3/07* (2006.01)

(52) U.S. Cl.
CPC ......... *H02M 1/0045* (2021.05); *H02M 3/073* (2013.01)

(58) Field of Classification Search
CPC ............................ H02M 1/0045; H02M 3/073
USPC ........................................................ 323/266
See application file for complete search history.

(56) References Cited

U.S. PATENT DOCUMENTS

| | | | |
|---|---|---|---|
| 9,634,559 B2* | 4/2017 | Kim | H02M 3/07 |
| 10,942,536 B1* | 3/2021 | Hassan | G05F 1/59 |
| 2010/0207684 A1 | 8/2010 | Park et al. | |
| 2014/0340058 A1 | 11/2014 | Wang | |
| 2021/0223810 A1 | 7/2021 | Golara | |
| 2021/0359599 A1 | 11/2021 | Zou et al. | |

OTHER PUBLICATIONS

Bhuiyan, M., et al., "CMOS Low-Dropout Voltage Regulator Design Trends: An Overview," Electronics, MDPI, Review, https://doi.org/10.3390/electronics11020193, Jan. 9, 2022, 30 pages.
Singh, G., et al., "High-Voltage-Tolerant I/O Buffers with Low-Voltage CMOS Process," 1512, IEEE Journal of Solid-State Circuits, vol. 34, No. 11, https://ieeexplore.ieee.org/abstract/document/799855, Nov. 1999, 14 pages.

(Continued)

*Primary Examiner* — Thienvu V Tran
*Assistant Examiner* — Lauren Ashley Shaw
(74) *Attorney, Agent, or Firm* — Edell, Shapiro & Finnan, LLC (57) ABSTRACT

A charge-pump based low dropout (LDO) regulator is provided that overcomes latch-up issues. The LDO regulator is a high PSR low noise LDO regulator that uses a latch-up mitigated charge-pump voltage doubler which includes a N-type metal-oxide-semiconductor field-effect transistor (MOSFET), NMOS, pass transistor. This LDO regulator architecture may be used to provide a very low-noise supply regulated output voltage with high power supply rejection for an on-chip low jitter oscillator. Latch-up is mitigated using control circuitry and a power supply timing sequence. This scheme ensures that parasitic diodes associated with various transistors in the regulator are not forward biased.

20 Claims, 8 Drawing Sheets

(56) References Cited

OTHER PUBLICATIONS

Park, S., et al., "CMOS cross-coupled charge pump with improved latch-up immunity," IEICE Electronics Express, vol. 6, No. 11, 736-742, https://www.jstage.jst.go.jp/article/elex/6/11/6_11_736/_article, Jun. 10, 2009, 7 pages.
Jo, Y., et al., "A 3.2-GHz Supply Noise-Insensitive PLL Using a Gate-Voltage-Boosted Source-Follower Regulator and Residual Noise Cancellation," 2170, 2170 IEEE Transactions on Very Large Scale Integration (VLSI) Systems, vol. 26, No. 10, https://ieeexplore.ieee.org/document/8396274, Oct. 2018, 5 pages.
Favrat, P., et al., "A High-Efficiency CMOS Voltage Doubler," IEEE Journal of Solid-State Circuits, vol. 33, No. 3, https://ieeexplore.ieee.org/document/661206, Mar. 1998, 7 pages.

* cited by examiner

LATCH-UP MITIGATED CHARGE PUMP FOR HIGH POWER SUPPLY REJECTION LOW-DROPOUT REGULATOR

TECHNICAL FIELD

The present disclosure relates to power supply regulators.

BACKGROUND

Low voltage, high-performance regulators are used to implement power-efficient mixed-signal electrical systems, such as wireline/wireless transceivers, low power processors, or any system that uses a low noise high-quality on-chip supply voltage.

It is desirable to minimize power consumption of so-called low-dropout (LDO) regulators for good system efficiency. Use of lower main supply voltage helps to reduce the power. LDO regulators can use charge-pump voltage doublers to achieve low voltage operation.

DETAILED DESCRIPTION

Overview

Presented herein is a LDO regulator that may be used as part of a power regulator system. The LDO regulator includes a pre-regulator circuit configured to receive an input voltage and to provide an internal regulated voltage, and to compare the internal regulated voltage with a voltage reference; a pre-regulator control switch coupled to the pre-regulator circuit and configured to control operation of the pre-regulator circuit; a voltage doubler comprising a cross-coupled pair of N-type metal oxide silicon (NMOS) transistors and a pair of charge pump capacitors, and a P-type metal oxide silicon (PMOS) switch circuit coupled to the cross-coupled pair of NMOS transistors, the PMOS switch circuit comprising PMOS transistor switches sharing a common Nwell node, the cross-coupled pair of NMOS transistors being connected to receive the internal regulated voltage from the pre-regulator circuit, wherein the voltage doubler is configured to produce an output voltage that is double the input voltage; a clock buffer circuit coupled to the voltage doubler and to the pre-regulator circuit; a logic gate coupled to the clock buffer circuit, the gate configured to receive a clock signal and a gating control signal as input; and an NMOS transistor switch connected to the PMOS switch circuit and configured to receive the input voltage and to charge the Nwell node of the PMOS switch circuit.

Example Embodiments

Next-generation optical transceivers may use very low jitter clocks due to stringent timing margins. Low jitter on-chip clock generators include blocks, such as a voltage controlled oscillator (VCO), divider, etc. VCOs are sensitive to power supply noise, and as a result they perform better with ultra-low noise LDO regulators that have with good power supply noise rejection (PSR).

In a specific application, a low jitter VCO benefits from an LDO regulator with low output noise (e.g. 5 nV/√Hz at 1 MHz) and wide band power supply rejection (e.g. greater than 40 dB) across process voltage and temperature (PVT). A charge pump based LDO with low pass filtering provides wide band power supply rejection (PSR) and low output noise. However, charge pumps are prone to latch-up issues both during steady state and supply ramp-up.

Presented herein is a charge-pump based LDO regulator that overcomes latch-up issues that occur in a conventional charge-pump based LDO. A high PSR low noise LDO regulator using a latch-up mitigated charge-pump voltage doubler is provided that includes a N-type metal-oxide-semiconductor field-effect transistor (MOSFET), NMOS, pass transistor. This LDO regulator architecture may be used to provide a very low-noise supply regulated output voltage with high power supply rejection for an on-chip low jitter oscillator. Latch-up is mitigated using control circuitry and a power supply timing sequence. As described further below, this scheme ensures that parasitic diodes associated with various transistors in the regulator are not forward biased.

Figure 1:
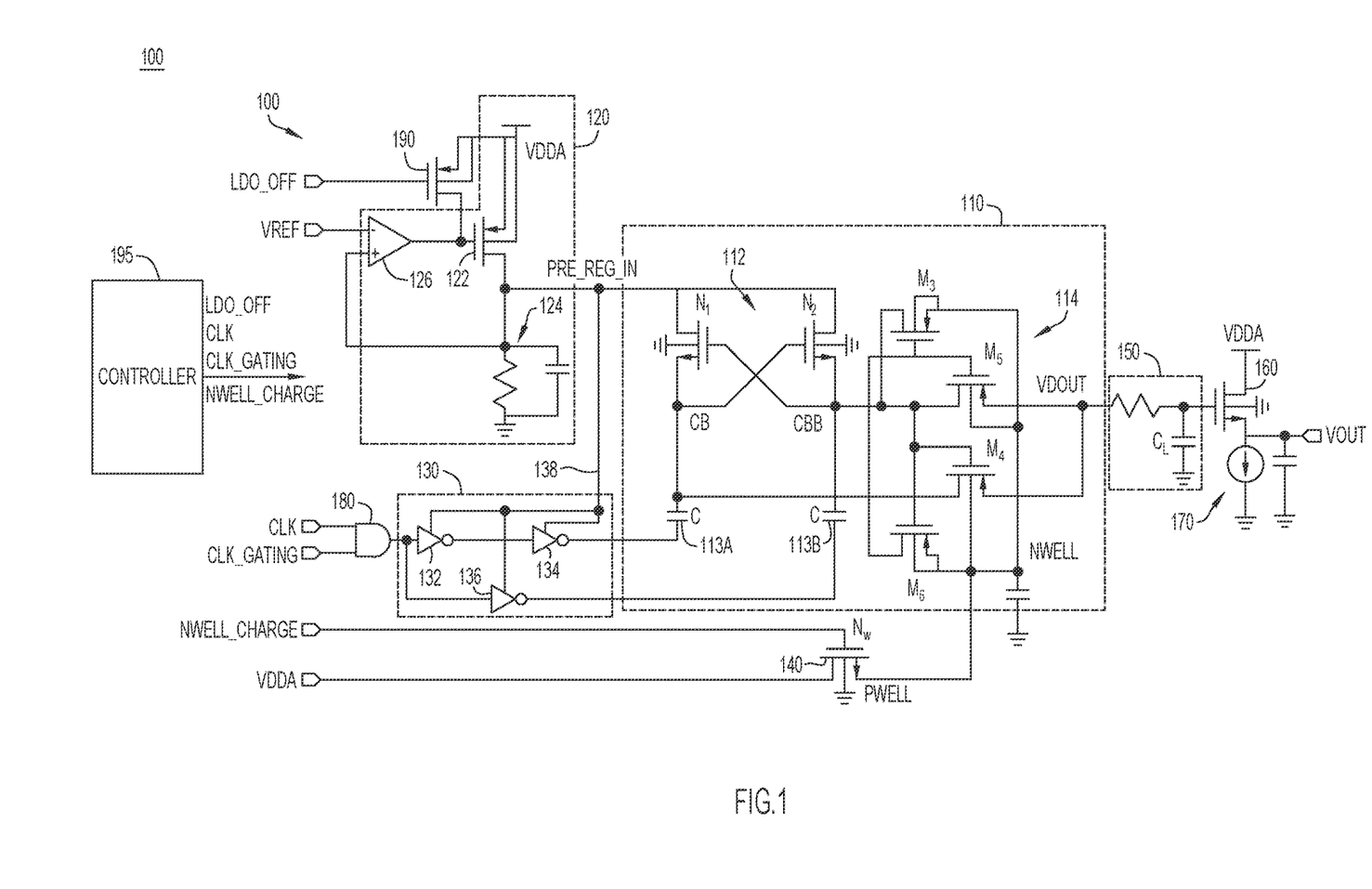
FIG. 1 is schematic diagram of a LDO regulator according to an example embodiment.

Reference is now made to FIG. 1, which shows a schematic diagram for a high PSR and low noise LDO regulator using a latch-up mitigated charge-pump voltage doubler. The LDO regulator is shown generally at reference numeral 100, and includes a charge pump voltage doubler 110 comprising a cross-coupled transistor pair 112 of NMOS transistors $N_1$ and $N_2$ and a PMOS switch circuit 114 coupled to the cross-coupled transistor pair 112. The charge pump voltage doubler 110 may be referred to herein sometimes as "charge pump" and sometimes as "voltage doubler". The voltage doubler 110 includes a pair of charge pump capacitors 113A and 113B shown in FIG. 1. The cross-coupled transistor pair 112 includes charge pump nodes CB and CBB which will be referred in the description below. Charge pump capacitor 113A is coupled to CB and charge pump capacitor 113B is coupled to CBB. The input to the LDO regulator 100 is the voltage VDDA and the output is the regulated output voltage VOUT.

The PMOS switch circuit 114 comprises P-type metal-oxide-semiconductor (PMOS) transistor switches M3, M4, M5 and M6, whose bodies are connected to a single node referred to as NWELL.

The LDO regulator 100 further includes a pre-regulator circuit 120. The pre-regulator circuit 120 is coupled to the charge-pump voltage doubler 110, and includes a PMOS pass transistor 122 connected to a resistor and de-coupling capacitor 124, and a differential operational amplifier (op-amp) 126. The drain terminal of PMOS pass transistor 122 is connected to a positive input of the differential op-amp 126 and a voltage VREF is connected to a negative input of differential op-amp 126. The output of differential op-amp 126 is connected to a gate of PMOS pass transistor 122. The inputs to the pre-regulator circuit 120 are VDDA and VREF. The output of the pre-regulator circuit 120 is an internal regulated voltage denoted PRE_REG_IN.

The cross-coupled transistor pair 112 is connected to receive the internal regulated voltage, PRE_REG_IN, from the pre-regulator circuit 120. The charge-pump voltage doubler 110 is configured to produce an output voltage VDOUT that is higher than the input voltage PRE_REG_IN. In this application the voltage VDOUT is twice PRE_REG_IN. Hence, the charge-pump voltage doubler 110 is configured as a voltage doubler for this particular application.

The LDO regulator 100 further includes a clock buffer circuit 130 coupled to the voltage doubler 110 and to the pre-regulator circuit 120. The clock buffer circuit 130 includes a plurality of buffers (inverters) 132, 134 and 136. The output of the buffer 134 is coupled to charge pump capacitor 113A and the output of buffer 136 is coupled to charge pump capacitor 113B. The internal regulated voltage PRE_REG_IN produced by the pre-regulator circuit is also connected, as shown at reference numeral 138, to provide a regulated voltage to the buffers 132, 134 and 136.

The pre-regulator circuit 120 provides a regulated voltage to the cross-coupled transistor pair 112 of the voltage doubler 110 and to the buffers 132, 134 and 136 of the clock buffer circuit. The pre-regulator circuit is a PMOS pass transistor based linear voltage regulator. The differential op-amp 126 compares the output voltage PRE_REG_IN with reference voltage VREF and adjusts the drain current of the PMOS pass transistor 122 to maintain a constant output voltage PRE_REG_IN. The pre-regulator circuit 120 maintains constant DC voltage PRE_REG_IN regardless of the input voltage (VDDA) and current drawn from the PRE_REG_IN node.

The LDO regulator 100 also includes a NMOS ($N_W$) transistor switch 140 connected to the PMOS switch circuit 114 of the voltage doubler 110. In one example, the $N_W$ transistor switch 140 is an NMOS transistor switch. The gate of the $N_W$ transistor switch 140 is coupled to a charge control signal denoted NWELL_CHARGE. The input to $N_W$ transistor switch 140 is VDDA. The $N_W$ transistor switch 140 is configured to charge the Nwell node of the PMOS switch circuit 114, as will be described in detail below. Thus, the output of the $N_W$ transistor switch 140 is Nwell.

Finally, the LDO regulator 100 includes a low-pass filter 150 coupled to an output, VDOUT, of the voltage doubler 110, and a NMOS pass transistor 160 coupled to an output of the low-pass filter 150. The low-pass filter 150 filters the voltage doubler output voltage, VDOUT. A current source 170 representing the load is also coupled to the NMOS pass transistor 160. The regulated output voltage, VOUT, of the LDO regulator 100 is taken at the drain of the NMOS pass transistor 160.

The LDO regulator 100 further includes control circuitry that includes a logic gate 180 coupled to the clock buffer circuit 130 and a pre-regulator control switch 190 coupled to the PMOS transistor 122 of the pre-regulator circuit 120. The logic gate 180 is, for example, an AND gate and it has a first input coupled to receive a clock signal (CLK) and a second input configured to receive a gating control signal (CLK_GATING). The pre-regulator control switch 190 is, for example, a PMOS transistor and is configured to receive as input a regulator control signal (LDO_OFF).

The regulator control signal LDO_OFF is applied to the pre-regulator control switch 190 to turn the pre-regulator circuit 120 off and thereby prevent internal regulated voltage, PRE_REG_IN, from charging the CB and CBB nodes of the cross-coupled transistor pair 112 during supply ramp-up, and then to turn on the pre-regulator circuit 120 after ramp-up is complete.

The gating control signal CLK_GATING is applied via gate 180 to the clock buffer circuit 130, thereby preventing the CB and CBB nodes from charging up during power supply ramp-up.

A controller 195 is provided that supplies the control signals including LDO_OFF, CLK, CLK_GATING and NWELL_CHARGE, for controlling operation of the LDO regulator 100. The controller 195 may be a microprocessor, microcontroller, digital signal processor, fixed or programmable digital logic gates, such is a programmable gate array or application specific integrated circuit (ASIC), etc.

Conventional charge pump voltage doublers address latch-up issue in steady state by Nwell body biasing techniques through commutating action of the PMOS switches, which ensures Nwell will be at the highest potential. However, transistors in the charge-pump topology are still prone to latch up during supply ramp-up e.g., during supply ramp-up the charging of Nwell node is slow as compared to the drain/source nodes of the PMOS switches.

Furthermore, in a conventional charge pump voltage doubler, the drain/source nodes (CB/CBB) of the cross-coupled NMOS transistors N1 and N2 can go below Pwell (0V) potential, which is connected to ground, when CLK is applied, and supply is ramping up. Similarly, the Nwell node is not a highest potential when supply is ramping up and CLK is applied.

However, for latch-up immunity, the Nwell node should be at highest potential and the Pwell node should be at a lowest potential both in transient (supply ramp-up) and steady state operation. Conventional voltage doublers fail to address latch-up issues in supply ramp-up because there is no mechanism for controlling the timing of the CLK signal, and the drain/source nodes of the transistors are not at lower potential as compared to the Nwell node.

Latch-up immunity is desired during supply ramp-up. The LDO regulator 100 charges the Nwell node using an auxiliary NMOS transistor switch 140 ($N_W$ transistor switch) to VDDA. Once that voltage is reached, the commutating function of the cross-coupled transistor pair 112 with the PMOS switch circuit 114, charges the Nwell node to 2*VDDA, thereby ensuring that Nwell is at the highest potential.

The LDO regulator 100 does not have a latch-up problem in both transient and steady states. The control circuitry referred to above, and a power supply timing sequence, are provided without any silicon area penalty.

Figure 2A:
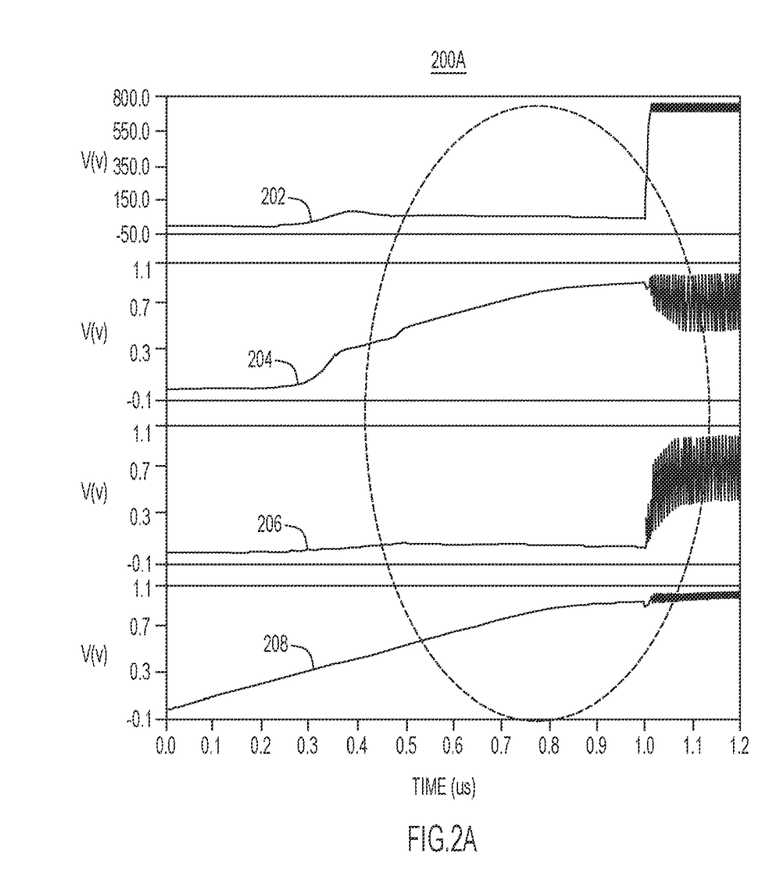
FIGS. 2A and 2B illustrates plots of waveforms that represent operation of the LDO regulator, according to an example embodiment.
Figure 2B:
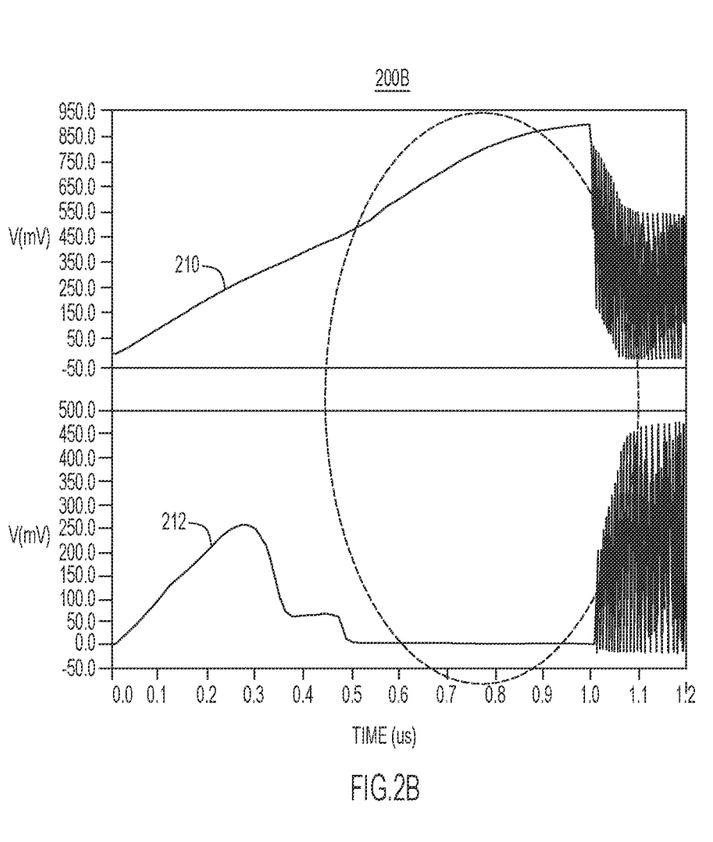

Reference is now made to FIGS. 2A and 2B, with continued reference to FIG. 1. FIGS. 2A and 2B show transient waveforms of the LDO regulator 100. FIG. 2A shows plots 200A of waveforms 202, 204, 206 and 208 for PRE_REG_IN, CB node, CBB node and Nwell node, respectively. The clock buffer is delayed and gated before applying to the charge pump capacitors 113A and 113B. The Nwell of the PMOS switch circuit 114 charges up faster as compared to nodes CB and CBB, as shown in FIG. 2A. As shown by plots 200B in FIG. 2B, during transient operation (ramp-up), the difference between Nwell and charge pump nodes (CB and CBB), denoted NWELL−CBB at 210 and NWELL−CB at 212, is positive, and the drain/source terminal of the NMOS transistors N1 and N2 of the cross-coupled transistor pair 112 does not go negative with respect to PWELL (0V), shown in plots 200A in FIG. 2A. Thus, Nwell is at the highest potential and all drain/source nodes of the circuit are at higher potential than PWELL. The voltage difference NWELL−CB and NWELL−CB is only −21 mV. There is little or no latch-up risk as a result.

Latch-up is mitigated during transient supply ramp-up because the voltage of the Nwell node of all the PMOS transistors of switch circuit 114 is greater than the voltage of the drain/source terminals, and the drain/source potential of the cross-coupled NMOS transistor pair is greater than the voltage of the Pwell node.

Figure 3:
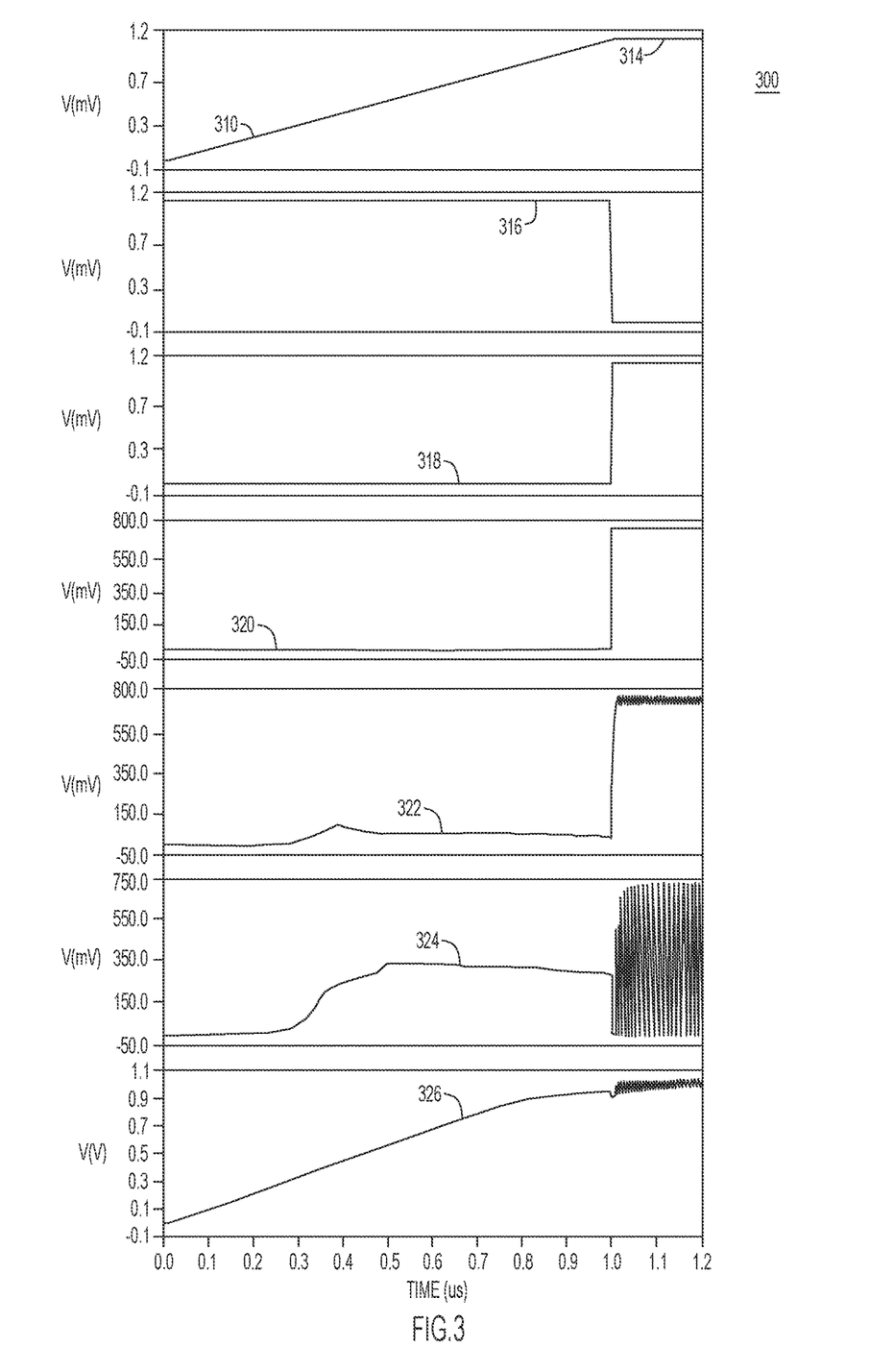
FIG. 3 illustrates timing of various control signals and waveforms associated with the LDO regulator, according to an example embodiment.

FIG. 3 shows plots 300 for control signals and key waveforms in the LDO regulator 100. Plot 310 is of the input voltage VDDA and as shown in FIG. 3, it is ramping up to its steading state voltage at 314. During this ramp-up phase, the NWELL_CHARGE signal is high as shown at 316, causing the $N_W$ transistor switch to connect VDDA to Nwell, thereby charging Nwell faster. The plot of Nwell is shown at reference numeral 326. Also, during ramp-up, the regulator control signal LDO_OFF signal is low as shown at 318, keeping the pre-regulator deactivated until ramp-up is completed. The regulator control signal LDO_OFF signal enables the pre-regulator circuit to be applied to charge-pump voltage doubler after supply ramp-up is completed. The PRE_REG_IN waveform is shown at 322 and is low until LDO_OFF goes high, after ramp-up is complete. Furthermore, the CLK_GATING signal is low during ramp-up as shown at 320, and only goes high after ramp-up to enable the clock buffer output be connected to the charge pump capacitors. At 324, the CLK signal is shown as being disabled/blocked until the CLK_GATING signal goes high. The nodes CB and CBB are also charged close to VDDA, and when CLK is applied, CB and CBB nodes are not at 0V.

Figure 4:
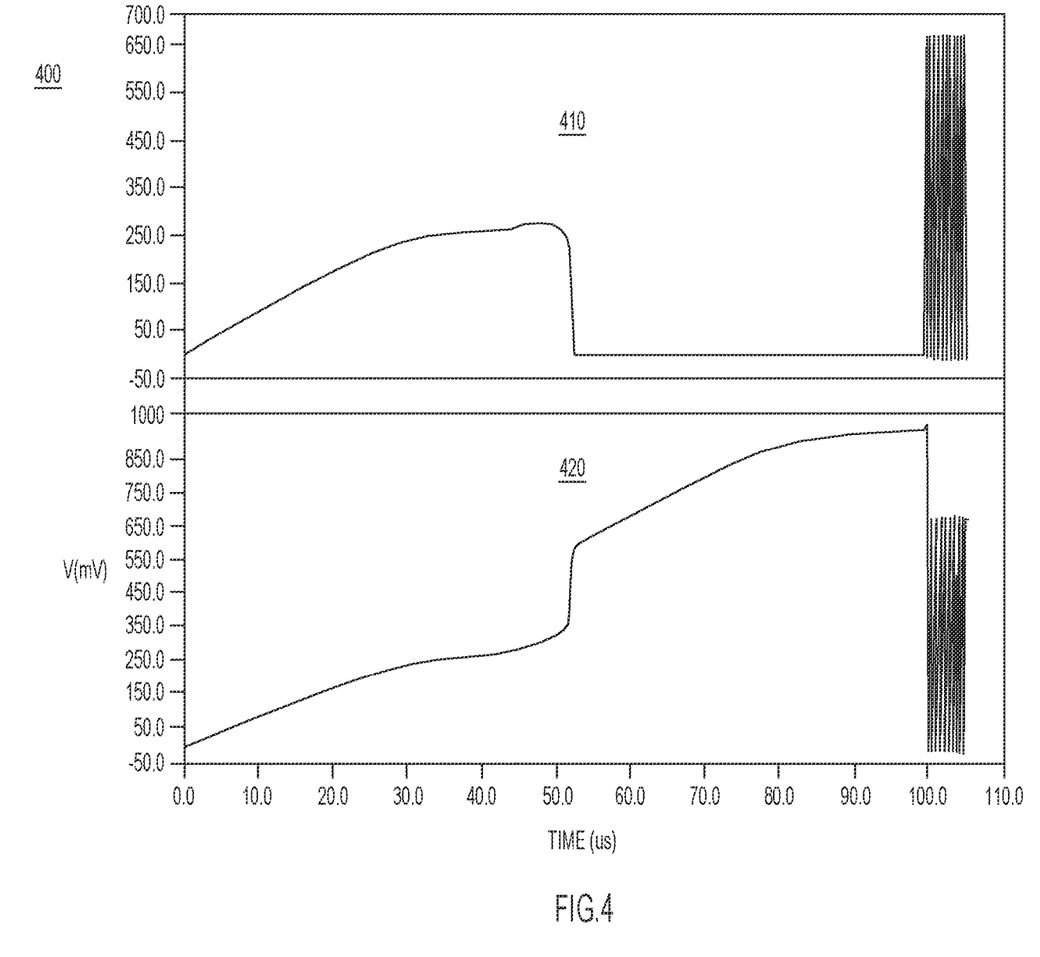
FIG. 4 illustrates plots showing waveforms for the difference between an Nwell node and charge pump nodes of the LDO regulator, according to an example embodiment.

FIG. 4 shows plots 400 of the difference between the voltage at Nwell and each of the CB and CBB nodes. Plot 410 is of Nwell−CB and plot 420 is of Nwell−CBB. Nwell of the PMOS transistors is charged at a rate close to supply ramp up thereby ensuring Nwell is at the highest potential during supply ramp-up. Drain/Source nodes CB/CBB are also at potential higher than Pwell potential. For example, the transient and steady state minimum transient voltage for NWELL−CB/CBB is greater than −20 mV. The transient and steady state minimum transient voltage for CB/CBB−PWELL is greater than 0 V.

In summary, a LDO regulator is provided that employs a switch (e.g., an NMOS) transistor that provides a fast-charging path for the Nwell node of PMOS transistors, thereby ensuring the Nwell node is at the highest potential during supply ramp-up. The NMOS transistor charges drain/source nodes of NMOS transistors close to the supply voltage thereby ensuring that drain/source of the NMOS transistor is at a higher potential as compared to the Pwell node (0V).

Figure 5:
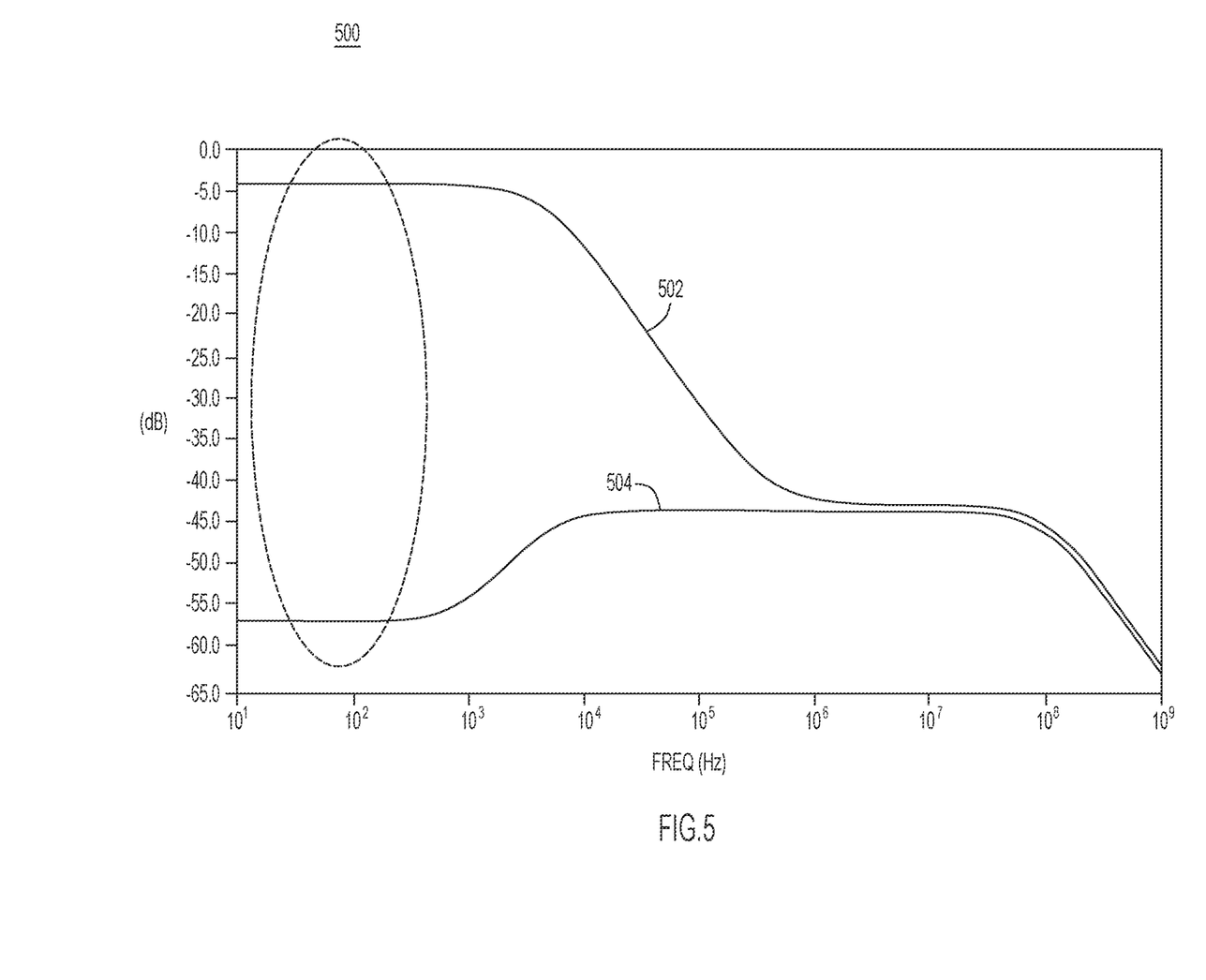
FIG. 5 is a diagram illustrating a comparison of the power supply rejection (PSR) characteristics of the LDO regulator presented with a conventional LDO regulator, according to an example embodiment.

Low frequency supply rejection of the LDO regulator presented herein is superior to that of a conventional LDO regulator, as depicted in FIG. 5. Clock buffer in the clock buffer circuit is provided with an internal regulated voltage (PRE_REG_IN), which is also the reference voltage to the charge-pump voltage doubler. The latch-up mitigated LDO regulator can operate from low supply voltage with excellent PSR, and output noise, thereby improving the power efficiency of the system in which it is used.

FIG. 5 shows plots 500 of PSR of the LDO regulator 100 as compared to a conventional LDO. Waveform 502 is the PSR of the conventional LDO and waveform 504 is the PSR of the LDO regular 100. As depicted by FIG. 5, the low frequency PSR of the LDO regulator 100 is improved over that of a conventional LDO.

Figure 6:
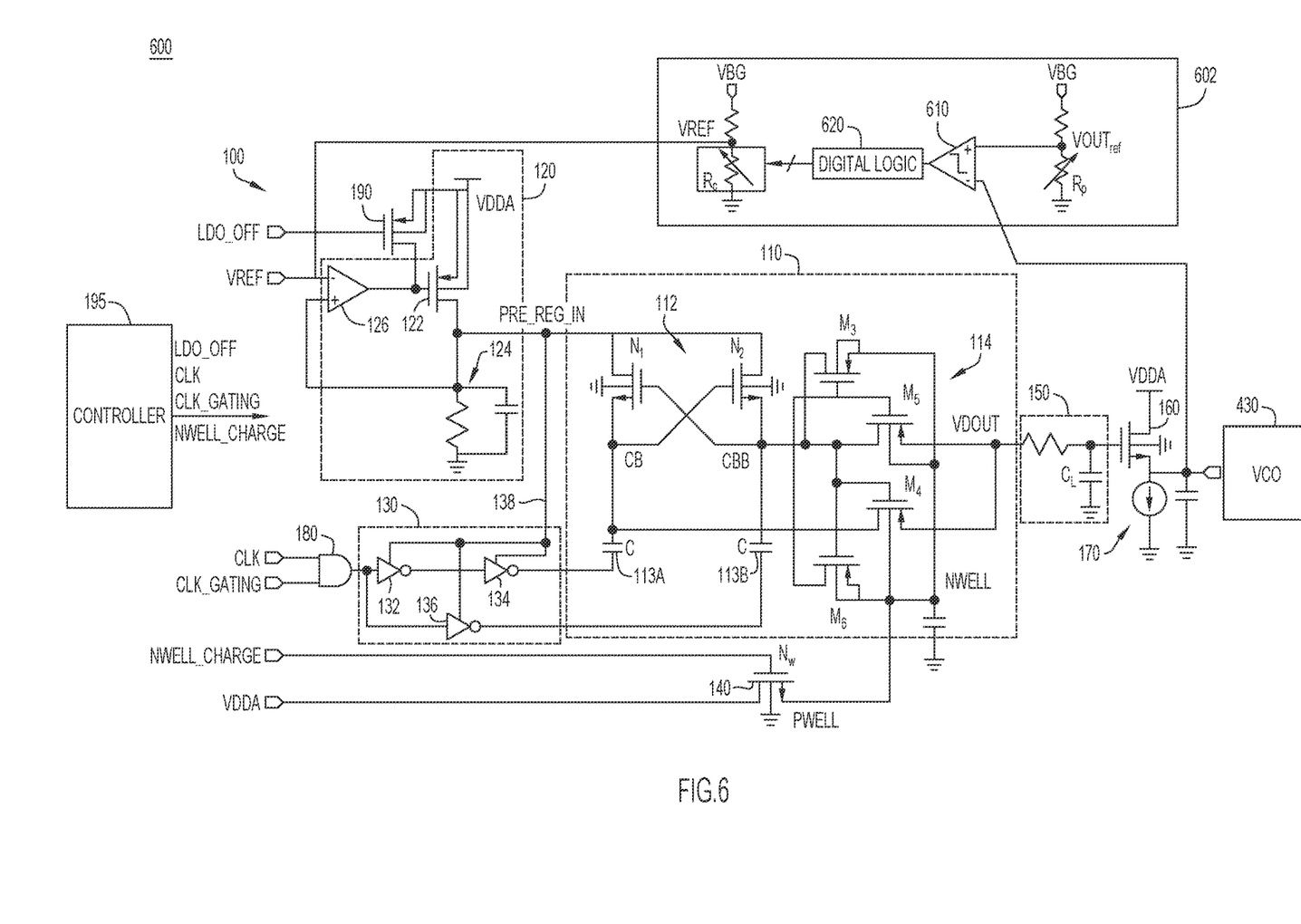
FIG. 6 is a schematic diagram of a power regulator system including the LDO regulator of FIG. 1 and a feedback loop used to control operation of the LDO regulator, according to an example embodiment.

Turning now to FIG. 6, a diagram is shown of a power regulator system 600 that includes the LDO regulator 100 and a DC feedback loop 602. The DC feedback loop 602 is coupled to receive as input the output voltage VOUT and to supply a correction to the voltage reference VREF at the negative input of the differential op-amp 126. The DC feedback loop 602 includes a comparator 610 having a positive input and a negative input. An output voltage reference VOUTref across a programmable resistor Rp is coupled to the positive input of the comparator 610 and the output voltage VOUT is coupled to the negative input of the comparator 610. The voltage VOUTref sets the desired output voltage of the LDO regulator 100. The comparator compares the output voltage VOUT with VOUTref and generates an output that is coupled to digital logic 620. The digital logic 620 generates an output that is used to control the value of the programmable resistor Rc. The bandgap voltage (VBG) and the programmable resistor Rc set the reference voltage value VREF. The digital logic 620 may be implemented by fixed or programmable digital logic gates, such as a digital signal processor, ASIC, field programmable gate array (FPGA), microprocessor or microcontroller, etc. In one example, the digital logic 620 may be a digital accumulator that accumulates/integrates a 1-bit output of comparator 610 to produce an N-bit digital output that controls programmable resistor Rc (a resistor ladder), which results in changing VREF of the pre-regulator circuit 120. This in turn changes VOUT of the LDO regulator 100. The comparator 610 compares VOUT with a VOUTref, and the feedback loop settles when an average output of the comparator is zero, i.e., when VOUT=VOUTref.

FIG. 6 also shows the LDO regulator 100 coupled to another device that may use the regulated voltage, VOUT, output by the LDO regulator 100. In one example, a VCO 430 may be coupled to the LDO regulator 100 to use the regulated voltage VOUT. This is only an example, as it should be understood that the LDO regulator 100 can be used by numerous other devices, such as dividers, etc.

Figure 7:
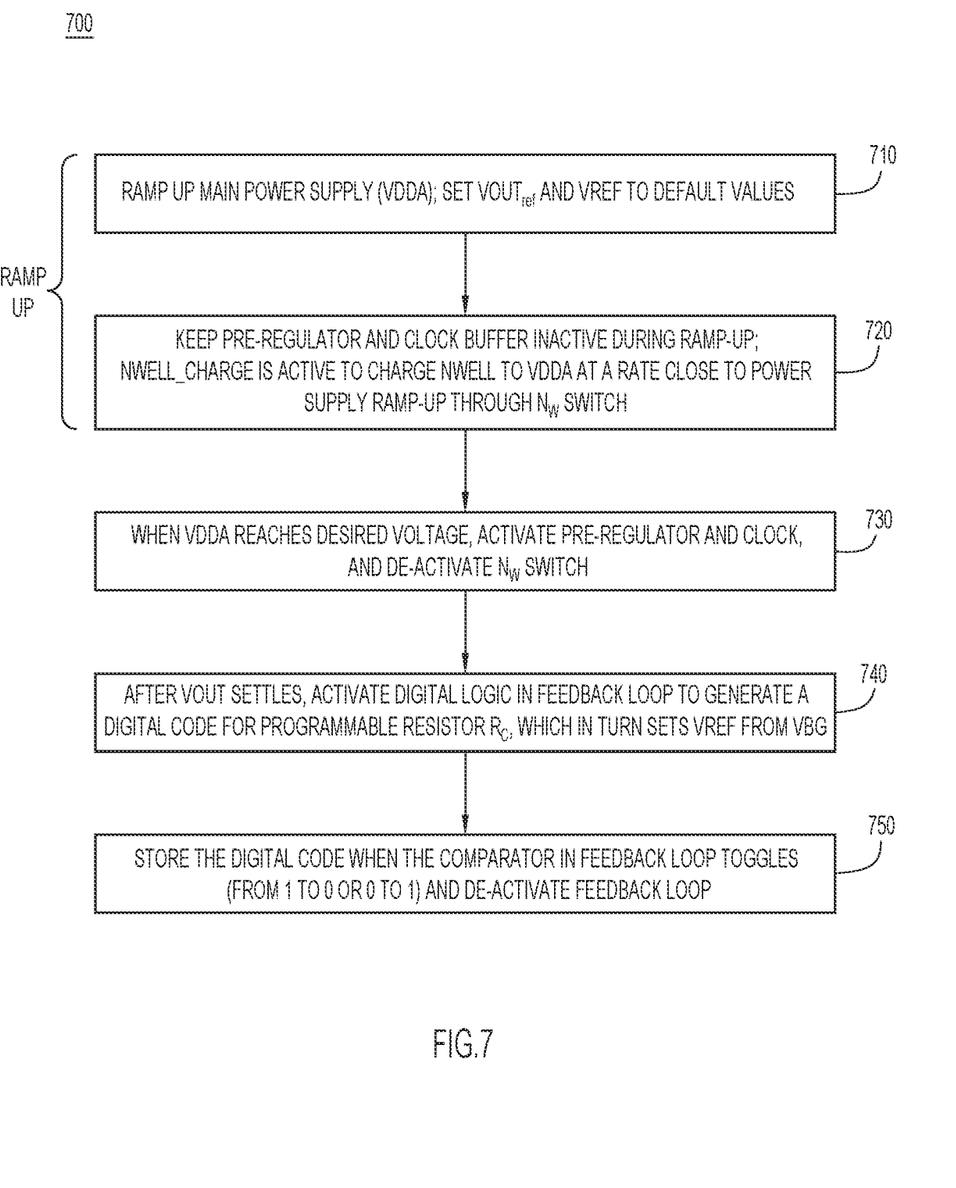
FIG. 7 is a flow chart depicting operation of the power regulator system of FIG. 6, according to an example embodiment.

Reference is now made to FIG. 7, with continued reference to FIG. 6. FIG. 7 shows a flow chart depicting an operational process 700 of the power regulator system 600 including the LDO regulator 100 and the DC feedback loop 602. At 710, ramp-up of the main power supply, the input voltage, VDDA, is initiated. Also, default values for VOUTref and VREF are set based on PVT parameters using the programmable resistors Rp and Rc, respectively. At 720, during ramp-up, the regulator control signal LDO_OFF is kept low in order to keep the pre-regulator circuit 120 off/disabled. Likewise, the gating control signal CLK_GATING is kept low to block the CLK signal from passing to the clock buffer circuit 130. On the other hand, the NWELL_CHARGE signal goes high in order to turn on the $N_W$ transistor switch 140 to facilitate faster charging of Nwell node as compared to CB/CBB nodes. At 730, when VDDA reaches its maximum value, the pre-regulator circuit is activated, the CLK signal is activated/allowed to pass through, and the $N_W$ transistor switch is de-activated.

At 740, after the output voltage VOUT settles, the DC feedback loop 602 is activated. The comparator 610 starts comparing VOUT with VOUTref. The digital logic 620 generates a digital code from the output of the comparator 610, and this digital code is used to adjust the value of the programmable resistor Rc that sets the value of VREF from VBG.

At 750, the digital code generated by the digital logic 620 for the programmable resistor Rc is stored when the output of the comparator 610 toggles from 1 to 0 or 0 to 1, at which time the DC feedback loop 602 is de-activated.

In summary, control circuitry is provided that includes a transistor switch (e.g., a PMOS transistor) controlled by a regulator control signal (LDO_OFF) with a timing sequence configured to keep the Nwell node at a highest potential and all drain/source nodes of the circuit at a potential higher than the Pwell node. The control circuitry also includes an AND logic gate controlled by a CLK_GATING control signal to provide the aforementioned timing sequence. Furthermore, the buffers in the block buffer circuit are connected to regulated voltage (PRE_REG_IN) which contributes to improved or low frequency power supply rejection at the LDO regulator output.

Figure 8:
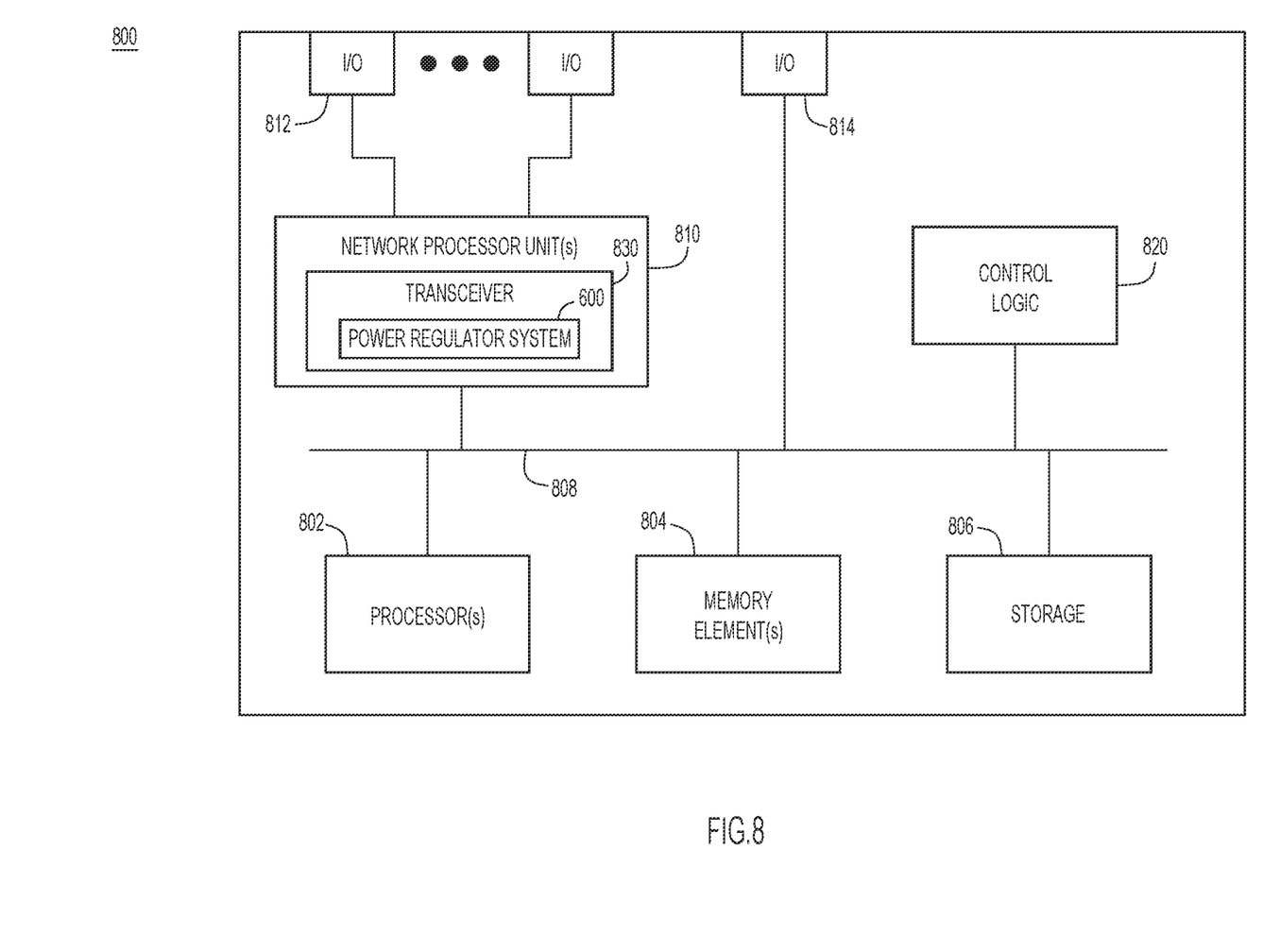
FIG. 8 illustrates a block diagram of a device in which the LDO regulator may be used, according to an example embodiment.

Referring to FIG. 8, FIG. 8 illustrates a block diagram of a device 800 that may perform functions associated with operations discussed herein in connection with the techniques depicted in FIGS. 1-7. In various embodiments, the device 800 may be a networking device, such as a high-speed optical router, as an example.

In at least one embodiment, the device 800 may be any apparatus that may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for device 800 can overlap in any manner and are not limited to the specific allocation of instructions and/or operations described herein. The network processor unit(s) 810 may include one or more various networking capabilities, such as optical networking capabilities, and in this regard, the network processor unit(s) 810 may include one or more optical transceivers 830, and the one or more optical transceivers 830 includes one or more instances of the power regulator system 600. The processor 802 may perform the operations of the controller 195 shown in FIGS. 1 and 4.

In at least one embodiment, the device 800 may be any apparatus that may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for device 800 can overlap in any manner and are not limited to the specific allocation of instructions and/or operations described herein. The network processor unit(s) 810 may include one or more various networking capabilities, such as optical networking capabilities, and in this regard, the network processor unit(s) 810 may include one or more optical transceivers 830, and the one or more optical transceivers 830 includes one or more instances of the power regulator system 600. The processor 802 may perform the operations of the controller 195 shown in FIGS. 1 and 4.

In at least one embodiment, processor(s) 802 is/are at least one hardware processor configured to execute various tasks, operations and/or functions for device 800 as described herein according to software and/or instructions configured for device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with device 800, and/or logic configured for memory element(s) 804 and/or storage 806. For example, any logic described herein (e.g., control logic 820) can, in various embodiments, be stored for device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of device 800 to communicate in order to exchange information and/or data. Bus 808 can be implemented with any architecture designed for passing control, data and/or information between processors, memory elements/storage, peripheral devices, and/or any other hardware and/or software components that may be configured for device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between device 800 and other systems, entities, etc., via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to device 800. For example, I/O interface(s) 814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In some aspects, the techniques described herein relate to an apparatus including: a pre-regulator circuit configured to receive an input voltage and to provide an internal regulated voltage, and to compare the internal regulated voltage with a voltage reference; a pre-regulator control switch coupled to the pre-regulator circuit and configured to control operation of the pre-regulator circuit; a voltage doubler including a cross-coupled pair of N-type metal oxide silicon (NMOS) transistors and a pair of charge pump capacitors, and a P-type metal oxide silicon (PMOS) switch circuit coupled to the cross-coupled pair of NMOS transistors, the PMOS switch circuit including PMOS transistor switches sharing a common Nwell node, the cross-coupled pair of NMOS transistors being connected to receive the internal regulated voltage from the pre-regulator circuit, wherein the voltage doubler is configured to produce a voltage doubler output voltage that is double the input voltage; a clock buffer circuit coupled to the voltage doubler and to the pre-regulator circuit; a logic gate coupled to the clock buffer circuit, the logic gate configured to receive a clock signal and a gating control signal as input; and an NMOS transistor switch connected to the PMOS switch circuit and configured to receive the input voltage and to charge the Nwell node of the PMOS switch circuit.

In some aspects, the techniques described herein relate to an apparatus, wherein the NMOS transistor switch is configured to charge the Nwell node of the PMOS switch circuit so that the Nwell node is kept at a higher potential compared to nodes of the cross-coupled pair of NMOS transistors of the voltage doubler before a clock signal is applied.

In some aspects, the techniques described herein relate to an apparatus, wherein the pre-regulator control switch is a PMOS transistor.

In some aspects, the techniques described herein relate to an apparatus, wherein the clock buffer circuit includes a plurality of buffers, and wherein each of the plurality of buffers is coupled to the internal regulated voltage produced by the pre-regulator circuit, and wherein first and second buffers of the plurality of buffers are coupled to respective ones of the pair of charge pump capacitors.

In some aspects, the techniques described herein relate to an apparatus, wherein: the pre-regulator control switch is configured to receive a regulator control signal that turns on and off the pre-regulator circuit; the logic gate is configured to pass the clock signal to the clock buffer circuit in response to the gating control signal; and the NMOS transistor switch is configured to initiate charging of the Nwell node in response to a charge control signal.

In some aspects, the techniques described herein relate to an apparatus, further including a controller configured to provide the clock signal, the regulator control signal, the gating control signal, and the charge control signal.

In some aspects, the techniques described herein relate to an apparatus, further including: a low pass filter coupled to the voltage doubler and configured to filter the voltage doubler output voltage to produce a filtered voltage; and an NMOS pass transistor coupled to the low pass filter and configured to output a regulated output voltage from the filtered voltage.

In some aspects, the techniques described herein relate to an apparatus, wherein during a voltage ramp-up phase when the input voltage is initially applied, the controller is configured to: generate the regulator control signal to keep the pre-regulator circuit turned off; generate the gating control signal to block the clock signal from passing to the clock buffer circuit; and generate the charge control signal to cause the NMOS transistor switch to turn on and charge the Nwell node to the input voltage.

In some aspects, the techniques described herein relate to an apparatus, wherein upon completion of the voltage ramp-up phase, the controller is configured to: modify the regulator control signal to turn on the pre-regulator circuit; modify the gating control signal allow the clock signal to pass to the clock buffer circuit; and modify the charge control signal to cause the NMOS transistor switch to turn off.

In some aspects, the techniques described herein relate to an apparatus, further including: a feedback loop coupled to receive as input the regulated output voltage and to adjust the voltage reference used by the pre-regulator circuit based on a difference between the regulated output voltage and an output voltage reference.

In some aspects, the techniques described herein relate to an apparatus, wherein the feedback loop includes: a comparator coupled to receive the regulated output voltage and the output voltage reference and to generate an output based on a difference between the regulated output voltage and the output voltage reference; digital logic coupled to the comparator and configured to generate a digital output based on the difference; and a programmable resistor coupled to the digital logic, the programmable resistor coupled to a voltage and configured to adjust its resistance based on the digital output in order to generate the voltage reference used by the pre-regulator circuit.

In some aspects, the techniques described herein relate to an apparatus including: a pre-regulator circuit configured to receive an input voltage and to provide an internal regulated voltage, and to compare the internal regulated voltage with a voltage reference; a pre-regulator control switch coupled to the pre-regulator circuit and configured to control operation of the pre-regulator circuit; a voltage doubler including a cross-coupled pair of N-type metal oxide silicon (NMOS) transistors and a pair of charge pump capacitors, and a P-type metal oxide silicon (PMOS) switch circuit coupled to the cross-coupled pair of NMOS transistors, the PMOS switch circuit including PMOS transistor switches sharing a common Nwell node, the cross-coupled pair of NMOS transistors being connected to receive the internal regulated voltage from the pre-regulator circuit, wherein the voltage doubler is configured to produce a voltage doubler output voltage that is double the input voltage; a clock buffer circuit coupled to the voltage doubler and to the pre-regulator circuit; a logic gate coupled to the clock buffer circuit, the logic gate configured to receive a clock signal and a gating control signal as input; an NMOS transistor switch connected to the PMOS switch circuit and configured to receive the input voltage and to charge the Nwell node of the PMOS switch circuit; a controller configured to: generate a regulator control signal coupled to the pre-regulator control switch to turn on and off the pre-regulator circuit; generate a gating control signal coupled to the logic gate control the logic gate to pass the clock signal to the clock buffer circuit; and generate a charge control signal coupled to the NMOS transistor switch to control the NMOS transistor switch to initiate charging of the Nwell node.

In some aspects, the techniques described herein relate to an apparatus, further including: a low pass filter coupled to the voltage doubler and configured to filter the voltage doubler output voltage to produce a filtered voltage; and an NMOS pass transistor coupled to the low pass filter and configured to output a regulated output voltage from the filtered voltage.

In some aspects, the techniques described herein relate to an apparatus, wherein during a voltage ramp-up phase when the input voltage is initially applied, the controller is configured to: generate the regulator control signal to keep the pre-regulator circuit turned off; generate the gating control signal to block the clock signal from passing to the clock buffer circuit; and generate the charge control signal to cause the NMOS transistor switch to turn on and charge the Nwell node to the input voltage.

In some aspects, the techniques described herein relate to an apparatus, wherein upon completion of the voltage ramp-up phase, the controller is configured to: modify the regulator control signal to turn on the pre-regulator circuit; modify the gating control signal allow the clock signal to pass to the clock buffer circuit; and modify the charge control signal to cause the NMOS transistor switch to turn off.

In some aspects, the techniques described herein relate to an apparatus, further including: a feedback loop coupled to receive as input the regulated output voltage and to adjust the voltage reference used by the pre-regulator circuit based on a difference between the regulated output voltage and an output voltage reference.

In some aspects, the techniques described herein relate to an apparatus, wherein the feedback loop includes: a comparator coupled to receive the regulated output voltage and the output voltage reference and to generate an output based on a difference between the regulated output voltage and the output voltage reference; digital logic coupled to the comparator and configured to generate a digital output based on the difference; and a programmable resistor coupled to the digital logic, the programmable resistor coupled to a voltage and configured to adjust its resistance based on the digital output in order to generate the voltage reference used by the pre-regulator circuit.

In some aspects, the techniques described herein relate to a method for providing a regulated voltage, including: during a ramp-up phase of an input voltage to be regulated: disabling a pre-regulator circuit; blocking a clock signal from passing to buffers of a clock buffer circuit; initiating charging to the input voltage of a Nwell node of a P-type metal oxide silicon (PMOS) switch circuit including PMOS transistor switches sharing in common the Nwell node, the PMOS switch circuit being part of a voltage doubler including a cross-coupled pair of N-type metal oxide silicon (NMOS) transistors and a pair of charge pump capacitors, the voltage doubler producing a voltage doubler output voltage that is double the input voltage and from which a regulated output voltage is derived; after ramp-up is complete: disabling charging of the Nwell node; permitting the clock signal to pass to the buffers of the clock buffer circuit; activating the pre-regulator circuit to receive the input voltage and to provide an internal regulated voltage, and to compare the internal regulated voltage with a voltage reference; and adjusting the voltage reference used by the pre-regulator circuit based on a difference between the regulated output voltage and an output voltage reference.

In some aspects, the techniques described herein relate to a method, wherein adjusting includes: generating an output based on a difference between the regulated output voltage and the output voltage reference; generating a digital output based on the difference; and adjusting resistance of a programmable resistor based on the digital output to generate the voltage reference used by the pre-regulator circuit.

In some aspects, the techniques described herein relate to a method, further including: low pass filtering the output voltage of voltage doubler to produce a filtered voltage; and applying the filtered voltage to an NMOS pass transistor to output the regulated output voltage.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. An apparatus comprising:
a pre-regulator circuit configured to receive an input voltage and to provide an internal regulated voltage, and to compare the internal regulated voltage with a voltage reference;
a pre-regulator control switch coupled to the pre-regulator circuit and configured to control operation of the pre-regulator circuit;
a voltage doubler comprising a cross-coupled pair of N-type metal oxide silicon (NMOS) transistors and a pair of charge pump capacitors, and a P-type metal oxide silicon (PMOS) switch circuit coupled to the cross-coupled pair of NMOS transistors, the PMOS switch circuit comprising PMOS transistor switches sharing a common Nwell node, the cross-coupled pair of NMOS transistors being connected to receive the internal regulated voltage from the pre-regulator circuit, wherein the voltage doubler is configured to produce a voltage doubler output voltage that is double the input voltage;
a clock buffer circuit coupled to the voltage doubler and to the pre-regulator circuit;
a logic gate coupled to the clock buffer circuit, the logic gate configured to receive a clock signal and a gating control signal as input; and
an NMOS transistor switch connected to the PMOS switch circuit and configured to receive the input voltage and to charge the Nwell node of the PMOS switch circuit.

2. The apparatus of claim 1, wherein the NMOS transistor switch is configured to charge the Nwell node of the PMOS switch circuit so that the Nwell node is kept at a higher potential compared to nodes of the cross-coupled pair of NMOS transistors of the voltage doubler before the clock signal is applied.

3. The apparatus of claim 1, wherein the pre-regulator control switch is a PMOS transistor.

4. The apparatus of claim 1, wherein the clock buffer circuit comprises a plurality of buffers, and wherein each of the plurality of buffers is coupled to the internal regulated voltage produced by the pre-regulator circuit, and wherein first and second buffers of the plurality of buffers are coupled to respective ones of the pair of charge pump capacitors.

5. The apparatus of claim 1, wherein:
the pre-regulator control switch is configured to receive a regulator control signal that turns on and off the pre-regulator circuit;
the logic gate is configured to pass the clock signal to the clock buffer circuit in response to the gating control signal; and
the NMOS transistor switch is configured to initiate charging of the Nwell node in response to a charge control signal.

6. The apparatus of claim 5, further comprising a controller configured to provide the clock signal, the regulator control signal, the gating control signal, and the charge control signal.

7. The apparatus of claim 6, further comprising:
a low pass filter coupled to the voltage doubler and configured to filter the voltage doubler output voltage to produce a filtered voltage; and
an NMOS pass transistor coupled to the low pass filter and configured to output a regulated output voltage from the filtered voltage.

8. The apparatus of claim 7, wherein during a voltage ramp-up phase when the input voltage is initially applied, the controller is configured to:
generate the regulator control signal to keep the pre-regulator circuit turned off;
generate the gating control signal to block the clock signal from passing to the clock buffer circuit; and
generate the charge control signal to cause the NMOS transistor switch to turn on and charge the Nwell node to the input voltage.

9. The apparatus of claim 8, wherein upon completion of the voltage ramp-up phase, the controller is configured to:
modify the regulator control signal to turn on the pre-regulator circuit;
modify the gating control signal to allow the clock signal to pass to the clock buffer circuit; and
modify the charge control signal to cause the NMOS transistor switch to turn off.

10. The apparatus of claim 9, further comprising:
a feedback loop coupled to receive as input the regulated output voltage and to adjust the voltage reference used by the pre-regulator circuit based on a difference between the regulated output voltage and an output voltage reference.

11. The apparatus of claim 10, wherein the feedback loop comprises:
a comparator coupled to receive the regulated output voltage and the output voltage reference and to generate an output based on a difference between the regulated output voltage and the output voltage reference;
digital logic coupled to the comparator and configured to generate a digital output based on the difference; and
a programmable resistor coupled to the digital logic, the programmable resistor coupled to a voltage and configured to adjust its resistance based on the digital output in order to generate the voltage reference used by the pre-regulator circuit.

12. A power regulator system comprising the apparatus of claim 1.

13. An optical transceiver comprising the power regulator system of claim 12.

14. A networking device comprising the optical transceiver of claim 13.

15. An apparatus comprising:
a pre-regulator circuit configured to receive an input voltage and to provide an internal regulated voltage, and to compare the internal regulated voltage with a voltage reference;
a pre-regulator control switch coupled to the pre-regulator circuit and configured to control operation of the pre-regulator circuit;
a voltage doubler comprising a cross-coupled pair of N-type metal oxide silicon (NMOS) transistors and a pair of charge pump capacitors, and a P-type metal oxide silicon (PMOS) switch circuit coupled to the cross-coupled pair of NMOS transistors, the PMOS switch circuit comprising PMOS transistor switches sharing a common Nwell node, the cross-coupled pair of NMOS transistors being connected to receive the internal regulated voltage from the pre-regulator circuit, wherein the voltage doubler is configured to produce a voltage doubler output voltage that is double the input voltage;
a clock buffer circuit coupled to the voltage doubler and to the pre-regulator circuit;

a logic gate coupled to the clock buffer circuit, the logic gate configured to receive a clock signal and a gating control signal as input;

an NMOS transistor switch connected to the PMOS switch circuit and configured to receive the input voltage and to charge the Nwell node of the PMOS switch circuit; and a controller configured to:
- generate a regulator control signal coupled to the pre-regulator control switch to turn on and off the pre-regulator circuit;
- generate a gating control signal coupled to the logic gate to control the logic gate to pass the clock signal to the clock buffer circuit; and
- generate a charge control signal coupled to the NMOS transistor switch to control the NMOS transistor switch to initiate charging of the Nwell node.

16. The apparatus of claim 15, further comprising:
a low pass filter coupled to the voltage doubler and configured to filter the voltage doubler output voltage to produce a filtered voltage; and
an NMOS pass transistor coupled to the low pass filter and configured to output a regulated output voltage from the filtered voltage.

17. The apparatus of claim 16, wherein during a voltage ramp-up phase when the input voltage is initially applied, the controller is configured to:
generate the regulator control signal to keep the pre-regulator circuit turned off;
generate the gating control signal to block the clock signal from passing to the clock buffer circuit; and
generate the charge control signal to cause the NMOS transistor switch to turn on and charge the Nwell node to the input voltage.

18. The apparatus of claim 17, wherein upon completion of the voltage ramp-up phase, the controller is configured to:
modify the regulator control signal to turn on the pre-regulator circuit;
modify the gating control signal to allow the clock signal to pass to the clock buffer circuit; and
modify the charge control signal to cause the NMOS transistor switch to turn off.

19. The apparatus of claim 18, further comprising:
a feedback loop coupled to receive as input the regulated output voltage and to adjust the voltage reference used by the pre-regulator circuit based on a difference between the regulated output voltage and an output voltage reference.

20. The apparatus of claim 19, wherein the feedback loop comprises:
a comparator coupled to receive the regulated output voltage and the output voltage reference and to generate an output based on a difference between the regulated output voltage and the output voltage reference;
digital logic coupled to the comparator and configured to generate a digital output based on the difference; and
a programmable resistor coupled to the digital logic, the programmable resistor coupled to a voltage and configured to adjust its resistance based on the digital output in order to generate the voltage reference used by the pre-regulator circuit.

* * * * *